United States Patent Office 3,196,471
Patented July 27, 1965

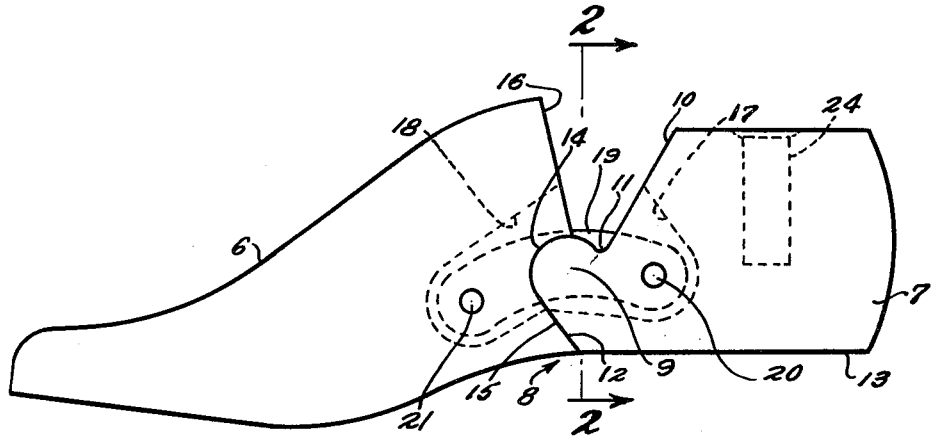
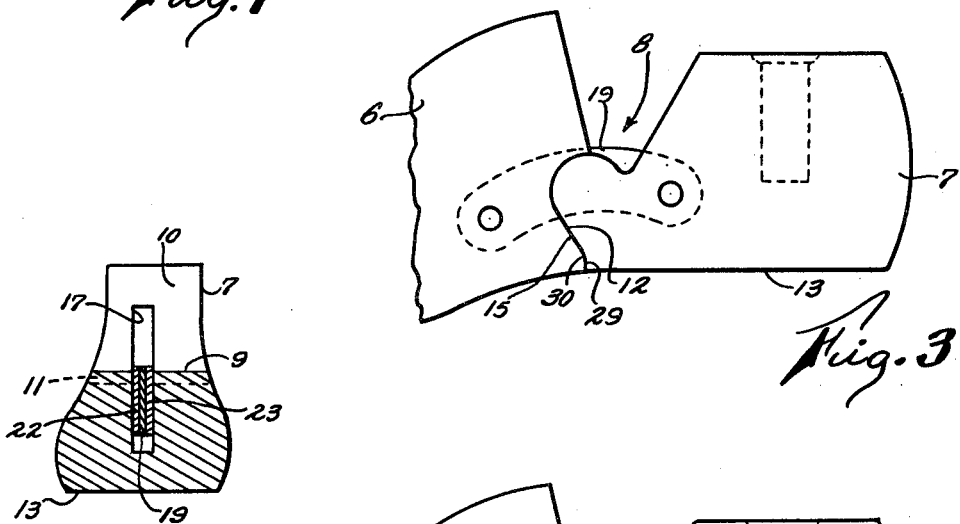
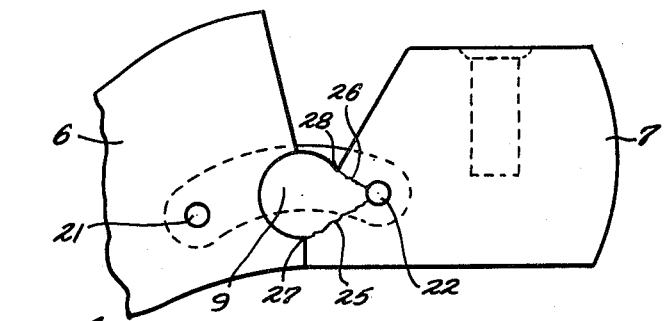

3,196,471
PLASTIC SHOE LAST CONSTRUCTION
Kenneth Heggs, Cincinnati, Ohio, and Charles J. Hunt, Morning View, Ky., assignors to Vulcan Corporation, Cincinnati, Ohio, a corporation of Ohio
Filed Apr. 6, 1964, Ser. No. 357,507
2 Claims. (Cl. 12—136)

The present invention relates to improvements in articulated, two-part shoe last constructions made of suitable plastic materials, such as high density polyethylene, and has for its principal object the provision of novel configurations for the cooperative mating surfaces of said last parts to secure stronger lasts and therefore a substantial increase in their usefulness.

Articulated, two-part shoe lasts composed of plastic materials are presently being used successfully in the shoe manufacturing industry and are beginning to supplant shoe lasts made of wood. One drawback to the widespread adoption of these plastic lasts is their tendency to split across areas of greatest stress, such places occurring around and adjacent the articulating hinges for the plastic last parts. Practices used for many years in the production of wood shoe lasts have been carried over and generally adopted in the manufacture of plastic shoe lasts and we have observed that whereas the existence of sharp corners in the mating surfaces of wood lasts did not adversely affect the strength of such lasts, perhaps because the wood grain was disposed vertically therein, such sharp corners apparently were responsible for many failures in non-grain plastic lasts when they were placed under tension during the shoe manufacturing process. We have discovered these failures to reside in the fact that during use plastic shoe last bodies tend to fracture toward and into the external corners of their mating surfaces but upon experimentation appeared not to fracture across identically dimensioned areas under similar operating conditions when the external corners of the mating surfaces were given smooth and rounded configurations.

It is therefore another object of our invention to eliminate sharp corners along the cooperative mating surfaces of articulated, two-part plastic shoe lasts and thereby produce more durable and stronger plastic lasts by reducing the tendency of cracking and fracture of the articulated last bodies in use.

A further object of the invention is to provide cooperative mating surfaces for hinged, two-part shoe lasts which will prevent fracture of the last part bodies under stress and will act to secure slight tangential slippage or relative movements between the hinged parts were said lasts to be accidentally placed under greater operating tensions than their rated capacities.

To these and other objectives, the invention consists of certain parts described hereinafter and illustrated in the accompanying drawing, in which:

FIG. 1 is a side elevational view of a shoe last embodying our plastic last construction.

FIG. 2 is a section taken on line 2—2 of FIG. 1.

FIG. 3 is a fragmental, elevational view of a modified form of our last shown in FIGS. 1 and 2.

FIG. 4 is a fragmental, side elevational view illustrating a conventional shoe last made of plastic.

To accomplish the objects and secure the advantages set out above, we have shown an articulated, two-part shoe last preferably formed from a solid plastic body of high density polyethylene, said shoe last having a forepart 6 and a heel part 7 articulated by a hinge generally indicated in the drawing by the numeral 8.

The heel part 7 is provided with cooperative and mating contact surfaces which are shown in the drawing as including a cylindrically shaped, integral shoulder 9 extending widthwise on the forwardly facing portion of the heel part 7. The forwardly facing portion of the heel part 7 is also provided with a downwardly and forwardly inclined, divergent face 10 which meets the cylindrical shoulder 9 in a smooth curved portion 11. A heightwise planar face 12 meets the lower part of the cylindrical shoulder 9 at a tangent to the shoulder and extends downwardly and rearwardly from its connection with the shoulder; the plane of the face passing through the insole 13 of the shoe last at an angle of approximately 15° with the vertical dimension of the shoe last.

The rear portion of the last forepart 6 has cooperative and mating contact surfaces corresponding to the contact surfaces on the heel part 7 and comprises a widthwise extending socket 14 that receives and slides on the cylindrical shoulder 9, said forepart having a heightwise planar face 15 which abuts the tangential face 12 on the heel part and extends downwardly and rearwardly from and tangent to the lower portion of the socket 14. A forwardly and upwardly inclined, divergent face 16 is formed on the rear portion of the forepart and meets the upper portion of the socket at an acute angle.

A kerf 17 extends heightwise in the central hinge portion of the heel part 7 while a similar kerf 18 extends heightwise in the central hinged portion of the last forepart 6. Both kerfs receive a spring link 19 which has one of its ends anchored in a pivot pin 20 extending widthwise through the heel part 7 and its opposite end anchored in a pivot pin 21 extending laterally through the forepart 6 of the last. As indicated in FIG. 2 the link 19 may have side plates 22 and 23 associated therewith which are each mounted loosely at their ends in the anchor pins 20 and 21.

The link and the pivot pins are so arranged with respect to the shoulder 9 that the pins are over-center with respect to the lateral axis of the shoulder when the last parts are in their expanded or collapsed positions whereby the link will strongly hold the last parts in the extended position shown in FIGS. 1 and 2 of the drawing to provide a form on which to build a shoe while securing the breaking of the last to a collapsed position to allow removal of the finished shoe therefrom.

In the shoe making process the plastic last described heretofore would be mounted upside down on a vertical jack pin, not shown, that would engage in a jack thimble 24 in the heel part and additional vertical support may often be provided under the forepart. When soles are lasted to the shoe uppers formed on the shoe last substantial downward pressures are often exerted on the sole that must be withstood by the last, and, as indicated in FIG. 4 of the drawing, such pressures exerted on conventional plastic lasts have too often resulted in fractures 25 and 26 extending, for example, toward the sharp corners 27 and 28, respectively, on each side of the shoulder 9. Our last, as illustrated, in FIGS. 1 and 2, has to a great extent overcome fracturing of the plastic lasts by providing the height-wise tangential cooperative faces 12 and 15 on the lower side of the shoulder 9 and the smooth curve 11 that leads from the upper portion of the shoulder into the face 10 on the heel part 7.

Further, the abutting tangential faces 12 and 15 on the cooperating mating faces of the fore and heel parts 6 and 7, respectively, permits minute tangential movement between said last parts when the sole pressures inadvertently become too great on the shoe being formed on the last, thus providing a slight resiliency in the last to prevent accidental breakage and fracture of the last body.

The plastic last shown in FIG. 3 of the drawings is a slight modification of the last shown in FIGS. 1 and 2 in that the lower end portion of the tangential faces 12 and 15 are turned forwardly in smooth curved portions 29 and 30, respectively, to meet the insole 13 at right angles. This last has all the non-fracturing features of the last shown in FIGS. 1 and 2 of the drawings, and will permit minute tangential slippage of the last parts when undue pressures are exerted on the shoe being formed thereon even though the mating surfaces on this last meet the insole at right angles.

It will therefore be understood that we have provided a strong and rugged plastic last structure that will have longer usefulness in that fractures of the plastic last bodies will be largely eliminated due to the novel configurations of the cooperative mating surfaces between the last parts.

What we claim as new is:

1. A two-part hinged last comprising a forepart and an adjacent heel part, a link connecting the forepart and the heel part for relative movements between an expanded position and a contracted position, a pivot pin anchoring one end of the link in the heel part, a pivot pin anchoring the opposite end of the link to the forepart, cooperative mating surfaces on said adjacent parts of the last extending heightwise of the last and consisting of a cylindrically shaped shoulder extending widthwise on the central portion of the heel part, a cooperative shoulder receiving socket formed on the forepart, abutting planar surfaces formed on the lower portions of the mating surfaces beneath the shoulder and socket and extending widthwise of the last, said surfaces being tangent to said shoulder and socket, respectively, and each planar surface lying in a plane passing through the insole of the last at an acute angle with respect to the vertical dimension of the last.

2. A two-part hinged last comprising a forepart and an adjacent heel part, a link connecting the forepart and the heel part for relative movements between an expanded position and a contracted position, a pivot pin anchoring one end of the link in the heel part, a pivot pin anchoring the opposite end of the link to the forepart, relatively divergent planar surfaces formed on the upper, opposed portions of the forepart and the heel part, cooperative mating surfaces on said adjacent parts of the last extending heightwise of the last and consisting of a cylindrically shaped shoulder extending widthwise on the central portion of the heel part, a smooth curved portion on the heel part connecting the divergent planar surface on said heel part to the upper end of the cylindrical shoulder, a cooperative shoulder receiving socket formed on the forepart and connected at its upper end to the remaining divergent planar surface on the forepart, abutting planar surfaces formed on the lower portions of the mating surfaces beneath the shoulder and socket and extending widthwise of the last, said surfaces being tangent to said shoulder and socket, respectively, and each surface lying in a plane passing through the insole of the last at an acute angle with respect to the vertical dimension of the last.

References Cited by the Examiner

UNITED STATES PATENTS

| 864,654 | 8/07 | Krentler | 12—136 |
| 877,995 | 2/08 | Hamblin | 12—136 |
| 1,770,597 | 7/30 | Peterson | 12—136 |
| 1,864,977 | 6/32 | Clarke | 12—136 |

JORDAN FRANKLIN, *Primary Examiner.*